(12) United States Patent
Guo

(10) Patent No.: US 11,249,337 B2
(45) Date of Patent: Feb. 15, 2022

(54) DISPLAY PANEL, DISPLAY CONTROL METHOD, AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Yuanhui Guo, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 884 days.

(21) Appl. No.: 16/064,676

(22) PCT Filed: Dec. 14, 2017

(86) PCT No.: PCT/CN2017/116193
§ 371 (c)(1),
(2) Date: Jun. 21, 2018

(87) PCT Pub. No.: WO2018/137434
PCT Pub. Date: Aug. 2, 2018

(65) Prior Publication Data
US 2021/0208435 A1    Jul. 8, 2021

Related U.S. Application Data

(63) Continuation of application No. PCT/CN2017/101537, filed on Sep. 13, 2017.

(30) Foreign Application Priority Data

Jan. 24, 2017 (CN) .......................... 201710054911.6
Jun. 2, 2017 (CN) .......................... 201710409677.4

(51) Int. Cl.
*G02F 1/1335* (2006.01)
*G02F 1/01* (2006.01)
(Continued)

(52) U.S. Cl.
CPC ...... *G02F 1/133528* (2013.01); *G02F 1/0136* (2013.01); *G02F 1/1347* (2013.01);
(Continued)

(58) Field of Classification Search
CPC combination set(s) only.
See application file for complete search history.

(56) References Cited

U.S. PATENT DOCUMENTS 8,471,969 B2 *   6/2013 Banin ................. B82Y 20/00
                                                        349/17
2016/0320664 A1 * 11/2016 Kang ............... G02F 1/133528
2017/0235174 A1 *  8/2017 Guo .................. G02F 1/13306
                                                        349/42

FOREIGN PATENT DOCUMENTS

CN       105676526 A      6/2016
CN       106094316 A     11/2016
(Continued)

OTHER PUBLICATIONS

Written Opinion dated Sep. 25, 2019 in KR10-2018-7022870.
(Continued)

*Primary Examiner* — Dung T Nguyen
(74) *Attorney, Agent, or Firm* — Syncoda LLC; Feng Ma

(57) ABSTRACT

A display panel includes a polarizer and a plurality of optical adjustment layers stacking over one another over the polarizer. The polarizer converts a light incident from its light-incident surface into a linearly polarized light emitting out from its light-emitting surface. Each optical adjustment layer includes a polarization direction-adjusting sub-layer and a quantum rod sub-layer over the polarization direction-
(Continued)

adjusting sub-layer. The polarization direction-adjusting sub-layer includes a plurality of adjusting portions and is configured to adjustably control a polarization direction of an incident polarized light. The quantum rod sub-layer includes a plurality of light-excitement portions, and is configured to adjustably change a wavelength of the incident polarized light. Each light-excitement portions contains a plurality of quantum rods, each having its long axis in a substantially same direction. By adjusting the incident light and controlling the plurality of optical adjustment layers, the display panel can realize a full-color display.

20 Claims, 9 Drawing Sheets

(51) Int. Cl.
    *G02F 1/1347*     (2006.01)
    *G02F 1/1343*     (2006.01)
    *G02F 1/139*     (2006.01)

(52) U.S. Cl.
    CPC ...... *G02F 1/1396* (2013.01); *G02F 1/133612* (2021.01); *G02F 1/134309* (2013.01); *G02F 2201/44* (2013.01); *G02F 2202/36* (2013.01)

(56) References Cited

FOREIGN PATENT DOCUMENTS

| | | |
|---|---|---|
| CN | 106444150 A | 2/2017 |
| KR | 10-2007-0107498 A | 11/2007 |

OTHER PUBLICATIONS

International Search Report and Written Opinion dated Mar. 14, 2018 in PCT/CN2017/116193.
IPI Office Action in Application No. 201847028267, dated Aug. 13, 2020.
CN 1st Office Action in Application No. 201710409677.4, dated Apr. 2, 2020.
KR Second Office Action in Application No. 20187022870 dated Feb. 24, 2020.
Extended European Search Report in Application No. EP17892061, dated Jul. 10, 2020.

\* cited by examiner

DISPLAY PANEL, DISPLAY CONTROL METHOD, AND DISPLAY APPARATUS

CROSS-REFERENCE TO RELATED APPLICATION

The present application claims priority to Chinese Patent Application No. 201710409677.4 filed on Jun. 2, 2017 and PCT Application No. PCT/CN2017/101537 filed on Sep. 13, 2017, the latter claiming priority to Chinese Patent Application No. 201710054911.6 filed on Jan. 24, 2017. The disclosures of these above patent applications are hereby incorporated by reference in their entirety.

TECHNICAL FIELD

The present disclosure relates generally to the field of display technologies, and specifically to a display panel, a display control method thereof, and a display apparatus.

BACKGROUND

Currently, in mainstream displaying technologies, a full-color display is typically realized by dividing each pixel (or pixel unit) into multiple sub-pixels, each configured to emit a light of a primary color (such as a red light, a green light, or a blue light), which can be combined together to form a light of a white color. A color of the whole pixel unit can be adjusted by adjusting the brightness of each of the multiple sub-pixels.

SUMMARY

In a first aspect, the present disclosure provides a display panel. The display panel includes a polarizer and a plurality of optical adjustment layers.

The polarizer is configured to convert a light incident from a light-incident surface thereof into a linearly polarized light emitting out from a light-emitting surface thereof. The plurality of optical adjustment layers are arranged to stack over one another over the light-emitting surface of the polarizer. Each optical adjustment layer includes a polarization direction-adjusting sub-layer and a quantum rod sub-layer.

The polarization direction-adjusting sub-layer includes a plurality of adjusting portions and is configured to adjustably control a polarization direction of an incident polarized light. The quantum rod sub-layer is disposed over a surface of the polarization direction-adjusting sub-layer distal to the polarizer. The quantum rod sub-layer includes a plurality of light-excitement portions and is configured to adjustably change a wavelength of the incident polarized light. Each of the plurality of light-excitement portions contains a plurality of quantum rods, and each of the plurality of quantum rods is configured to have a long axis thereof to be in a substantially same direction.

Herein, the plurality of adjusting portions in the polarization direction-adjusting sub-layer and the plurality of light-excitement portions in the quantum rod sub-layer in each of the plurality of optical adjustment layers can respectively correspond to a plurality of display units, configured such that an orthographic projection of one light-excitement portion corresponding to a display unit on the polarizer overlaps with an orthographic projection of one adjusting portion corresponding to a same display unit on the polarizer.

In the display panel, each of the plurality of adjusting portions in the polarization direction-adjusting sub-layer in each of the plurality of optical adjustment layers can comprise a liquid crystal sub-layer and at least one driving electrode.

Herein, the liquid crystal sub-layer contains a plurality of liquid crystals, and the at least one driving electrode is disposed over one side, or two opposing sides, of the liquid crystal sub-layer. The at least one driving electrode is configured to apply an electric field to the liquid crystal sub-layer to adjust an orientation of the plurality of liquid crystals therein to thereby adjustably control the polarization direction of the incident polarized light.

The at least one driving electrode in each of the plurality of adjusting portions in the polarization direction-adjusting sub-layer in each of the plurality of optical adjustment layers can consist of a first electrode and a second electrode, which are arranged over two opposing sides of the liquid crystal sub-layer. It can be configured such that at least one of the first electrode and the second electrode in each adjusting portion is configured to be spaced apart from a corresponding electrode in an adjacent adjusting portion to thereby allow an electric field formed therebetween to be insulated from one another.

According to some embodiments of the display panel, at least one of the first electrode and the second electrode in a polarization direction-adjusting sub-layer of one optical adjustment layer can be shared with a corresponding electrode in an adjacent optical adjustment layer.

In the display panel, each of the plurality of adjusting portions in the polarization direction-adjusting sub-layer in each of the plurality of optical adjustment layers can further include two alignment sub-layers, which are arranged respectively at two opposing sides of, and contacting with, the liquid crystal sub-layer, and configured to horizontally align the liquid crystal sub-layer. The two alignment sub-layers are configured to have respective alignment directions thereof substantially perpendicular to each other to thereby form a twisted nematic (TN) structure.

In the display panel as described above, the two alignment sub-layers can be further configured such that one of the two alignment sub-layers proximate to the quantum rod sub-layer in the each of the plurality of optical adjustment layers has an alignment direction thereof substantially perpendicular to a direction of long axes of the plurality of quantum rods; and another of the two alignment sub-layers distal to the quantum rod sub-layer in the each of the plurality of optical adjustment layers has an alignment direction thereof substantially parallel to the direction of the long axes of the plurality of quantum rods in the quantum rod sub-layer.

According to some embodiments, the alignment direction of the another of the two alignment sub-layers is configured to be substantially parallel to a polarization direction of the polarizer.

In the display panel disclosed herein, the plurality of optical adjustment layers can be configured such that each light-excitement portion in a same quantum rod sub-layer is capable of emitting a light having a substantially same color upon excitement; and each light-excitement portion in a different quantum rod sub-layer is capable of emitting a light having a different color upon excitement.

In a second aspect, the disclosure further provides a display apparatus, which contains a display panel according to any one of the embodiments as described above.

In the display apparatus, each of the plurality of adjusting portions in the polarization direction-adjusting sub-layer in each of the plurality of optical adjustment layers in the display panel can include a liquid crystal sub-layer and at least one driving electrode.

The liquid crystal sub-layer contains a plurality of liquid crystals, and the at least one driving electrode can be disposed over one side, or two opposing sides, of the liquid crystal sub-layer, and are configured to apply an electric field to the liquid crystal sub-layer to adjust an orientation of the plurality of liquid crystals therein to thereby adjustably control the polarization direction of the incident polarized light.

As such, the display apparatus can further include a first driving circuit, which is coupled with, and configured to provide driving signals to, the at least one driving electrode in each of the plurality of adjusting portions in the polarization direction-adjusting sub-layer in the each of the at least one optical adjustment layer.

In the display apparatus, the at least one driving electrode in each of the plurality of adjusting portions in the polarization direction-adjusting sub-layer in the each of the at least one optical adjustment layer can consist of a first electrode and a second electrode, which are arranged over two opposing sides of the liquid crystal sub-layer. The first driving circuit can be configured to provide a pixel voltage and a common voltage respectively to one and another of the first electrode and the second electrode.

The display apparatus can further include a light source, disposed over the light-incident surface of the polarizer. The light source can contain a light-emitting layer configured to emit a light capable of exciting the plurality of quantum rods in each of the plurality of light-excitement portions in the quantum rod sub-layer in the each of the plurality of optical adjustment layers.

In the display apparatus, the plurality of optical adjustment layers can be each configured to be capable of emitting a light of a different color upon excitement, and together configured to be able to allow output of a light of white color through mixing of the light from each of the plurality of optical adjustment layers.

According to some embodiments of the display apparatus, the light-emitting layer in the light source is configured to emit a blue light, and the plurality of optical adjustment layers include a lower optical adjustment layer and an upper optical adjustment layer, which are disposed successively over the polarizer and respectively configured to be capable of emitting a green light and a red light upon excitement.

In any one of the embodiments of the display apparatus as described above, the light-emitting layer can comprise an organic electroluminescent layer.

The display apparatus can further comprise a second driving circuit, which is configured to adjust a brightness of the light emitted by the light-emitting layer of the light source.

In a third aspect, the disclosure further provides a method for controlling a display for a display panel. The display control method comprises the following two steps:

providing a light incident into the polarizer to thereby obtain a linearly polarized light; and controlling each of the plurality of optical adjustment layers such that, upon an input of the linearly polarized light into a lowermost optical adjustment layer, a light of a specified color in a corresponding display unit is outputted from an uppermost optical adjustment layer.

In the display control method as described above, each of the plurality of adjusting portions in the polarization direction-adjusting sub-layer in each of the plurality of optical adjustment layers can include a liquid crystal sub-layer and at least one driving electrode. The liquid crystal sub-layer contains a plurality of liquid crystals, and the at least one driving electrode are disposed over one side, or two opposing sides, of the liquid crystal sub-layer, and are configured to apply an electric field to the liquid crystal sub-layer to adjust an orientation of the plurality of liquid crystals therein to thereby adjustably control the polarization direction of the incident polarized light.

As such, the step of controlling each of the plurality of optical adjustment layers can comprise:

providing a driving voltage to the at least one driving electrode in each of the plurality of adjusting portions in the polarization direction-adjusting sub-layer in each of the plurality of optical adjustment layers to thereby apply the electric field to the liquid crystal sub-layer.

In the method as described above, the light can be a blue light, and the plurality of optical adjustment layers can comprise a lower optical adjustment layer and an upper optical adjustment layer, successively over the polarizer and respectively configured to be capable of emitting a green light and a red light upon excitement.

As such, the step of providing a light incident into the polarizer to thereby obtain a linearly polarized light comprises:

providing the blue light incident into the polarizer to thereby obtain a blue linearly polarized light;

Correspondingly, the sub-step of providing a driving voltage to the at least one driving electrode in each of the plurality of adjusting portions in the polarization direction-adjusting sub-layer in each of the plurality of optical adjustment layers comprises:

providing a first driving voltage and a second driving voltage respectively to the at least one driving electrode in each of the plurality of adjusting portions in the polarization direction-adjusting sub-layer in the lower optical adjustment layer and in an upper optical adjustment layer such that a full-color display for the display panel is realized.

Other embodiments of the disclosure may become apparent to people of ordinary skills in the field in light of the embodiments as described above.

BRIEF DESCRIPTION OF DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of the embodiments disclosed herein, the technical solutions of the embodiments of the invention will be described in a clear and fully understandable way. It is noted that the described embodiments are merely a portion but not all of the embodiments of the invention. Based on the described embodiments of the invention, those ordinarily skilled in the art can obtain other embodiment(s), which come(s) within the scope sought for protection by the invention.

In a conventional display panel, typically the multiple sub-pixels included in one pixel (i.e. pixel unit) which are configured to respectively emit a light of a different primary color are arranged side by side, and a full-color display is realized by mixing the various light emitted from each of the multiple sub-pixels.

Figure 1A:
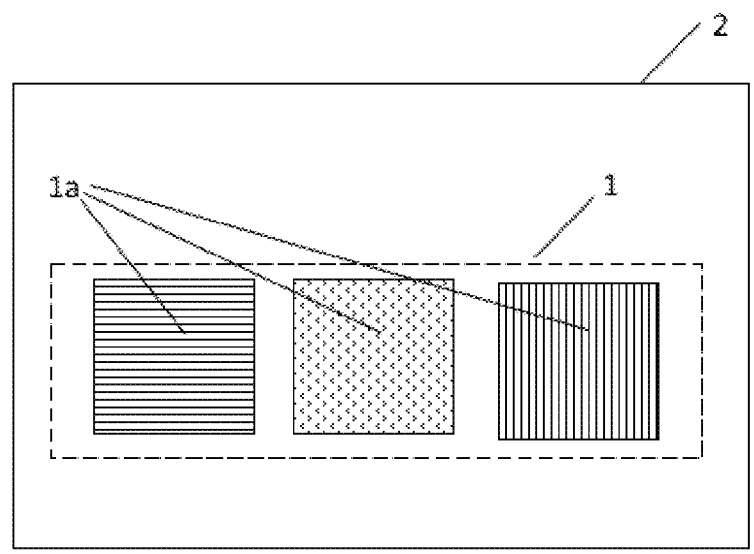
FIG. 1A and FIG. 1B are respectively a top view and a sectional view of a pixel unit in a display panel according to a related display technology.
Figure 1B:
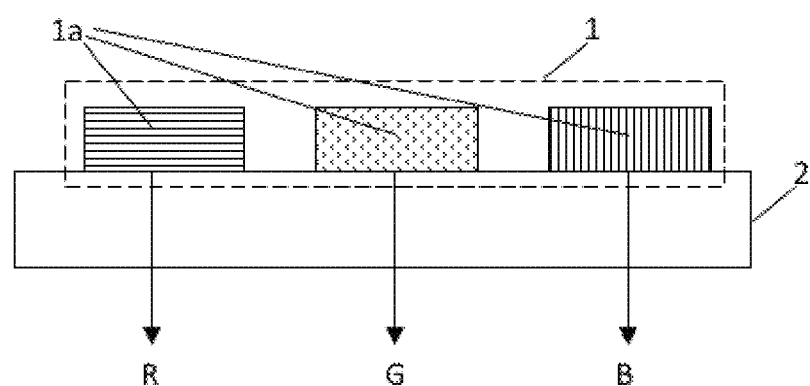

FIG. 1A and FIG. 1B respectively shows a top view and a sectional view of one pixel in a display panel according to a related display technology. As illustrated in the figures, each pixel 1 includes three sub-pixels 1a (i.e. a red sub-pixel R, a green sub-pixel G, and a blue sub-pixel B), which are configured to respectively emit a red light, a green light, and a blue light.

Further as shown in the figures, the three sub-pixels 1a (R, G, and B) are arranged side by side over a substrate 2, and are substantially arranged in a plane that is substantially perpendicular to a direction of light transmission. Due to this spreading arrangement of multiple sub-pixels 1a in a plane that is substantially perpendicular to a direction of light transmission, this above-mentioned conventional display panel is not advantageous for achieving a high-definition display. In addition, for most images that are displayed, because only one or two sub-pixel(s) is utilized for display, the light utilization rate is also relatively low.

One purpose of the present disclosure is to address these disadvantages associated with conventional display panels.

Figure 2A:
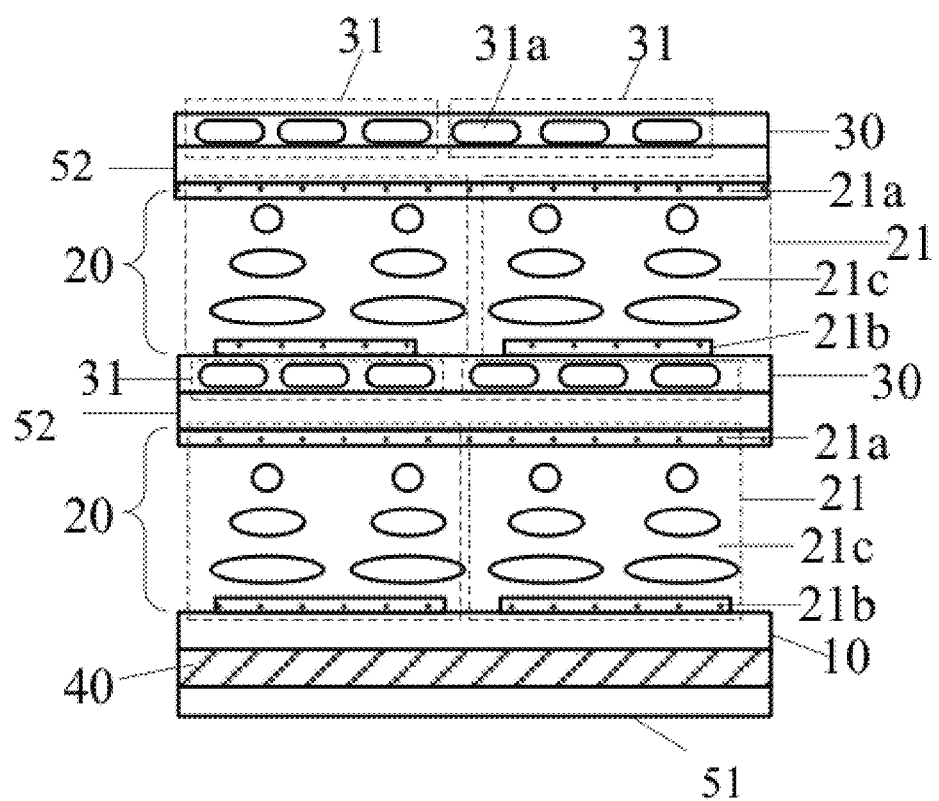
FIG. 2A and FIG. 2B illustrate a structural diagram of a display panel according to two embodiments of the present disclosure.

In a first aspect, a display panel is disclosed, which is illustrated in FIG. 2A.

As shown in the figure, the display panel comprises a polarizer 10 and a plurality of optical adjustment layers which are stacked successively over a surface of the polarizer 10 in a direction gradually farther away from the polarizer 10 (i.e. the plurality of optical adjustment layers are stacked over one another over a top surface of the polarizer 10, as illustrated in FIG. 2A).

Each of the plurality of optical adjustment layers comprises at least one polarization direction-adjusting sub-layer 20 and at least one quantum rod sub-layer 30.

In each optical adjustment layer, each of the at least one polarization direction-adjusting sub-layer 20 comprises a plurality of adjusting portions 21. The plurality of adjusting portions 21 are arranged in a plane that is substantially perpendicular to a thickness direction of the display panel (i.e. a direction of light transmission of the display panel, as shown as the bottom-to-top direction in FIG. 2A), and can be arranged in a matrix having a plurality of rows and a plurality of columns. Each adjusting portion 21 is configured to adjust a polarization direction of a linearly polarized light entering the each adjusting portion 21.

Each of the at least one quantum rod sub-layer 30 is disposed over a surface of one of the at least one polarization direction-adjusting sub-layer 20 that is opposing or distal to the polarizer 10 (i.e. an upper surface of the one of the at least one polarization direction-adjusting sub-layer 20 as illustrated in FIG. 2A). Each of the at least one quantum rod sub-layer 30 comprises a plurality of light-excitement portions 31, as shown in FIG. 2A (i.e. a sectional view of the display panel) and FIG. 3 (i.e. a top view of the display panel).

The plurality of light-excitement portions 31 in each quantum rod sub-layer 30 and the plurality of adjusting portions 21 in each polarization direction-adjusting sub-layer 20 are configured to have a one-to-one corresponding relationship, i.e. an orthographic projection of each light-excitement portion 31 on the polarizer 10 is arranged to be at least overlapped, and preferably completely match, with an orthographic projection of each adjusting portion 21 on the polarizer 10 at least overlap. They substantially correspond to a pixel, or a display unit, for the display panel.

Figure 3:
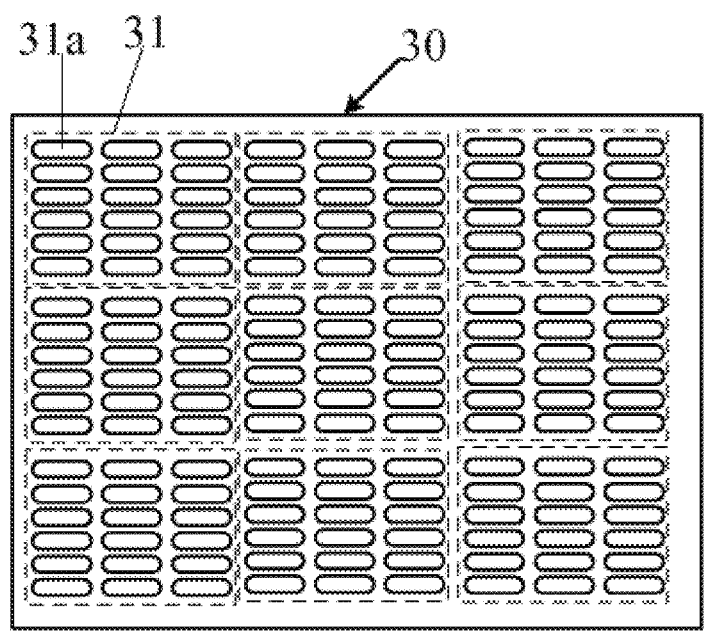
FIG. 3 is a top view of the display panel as shown in FIG. 2A.

Further as illustrated in FIG. 2A and FIG. 3, each of the plurality of light-excitement portions 31 comprises a plurality of quantum rods 31a. The plurality of quantum rods 31a are configured such that a long axis of each of the plurality of quantum rods 31a in a same light-excitement portion 31 has a substantially same direction. According to some embodiments, the plurality of quantum rods 31a are further configured such that a light excited by each of the plurality of quantum rods 31a in a same quantum rod sub-layer 30 has a substantially same color, and that a light excited by each of the plurality of quantum rods 31a in a different quantum rod sub-layer 30 has a different color.

Figure 4:
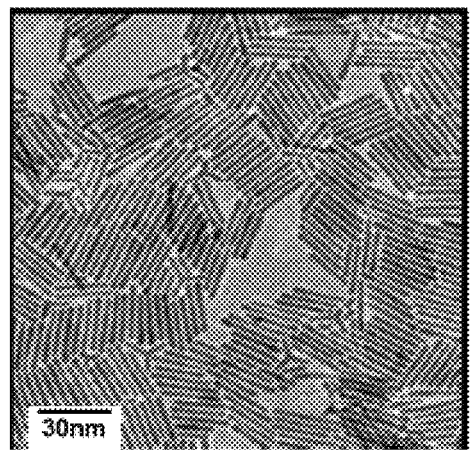
FIG. 4 is a scanning electron microscope (SEM) photo of a quantum rod sub-layer.

FIG. 4 shows a scanning electron microscope (SEM) photo of quantum rods according to an existing technology. As illustrated in FIG. 4, each quantum rod has a substantially same shape and dimension (or size). It is noted that each the plurality of quantum rods 31a in each of the plurality of light-excitement portions 31 has a similar shape as the quantum rod as illustrated in FIG. 4. It should be noted that FIG. 4 is only a schematic diagram illustrating the shapes of the quantum rods, and does not represent the directions of the quantum rods arranged in the quantum rod sub-layer 30 in the present disclosure.

As a semi-conductor nanomaterial, the plurality of quantum rods can emit a light (i.e. excited light) upon being excited by an exciting light depending on the relative angle between the polarization direction of the exciting light and the long axes of the plurality of quantum rods.

If the plurality of quantum rods are excited by an exciting light whose polarization direction is substantially parallel to the long axes of the plurality of quantum rods, the plurality of quantum rods can emit a light (i.e. excited light), yet the color of the excited light depends on the diameters of the plurality of quantum rods.

If the plurality of quantum rods are excited by an exciting light whose polarization direction is substantially perpendicular to the long axes of the plurality of quantum rods, the plurality of quantum rods can emit a light (i.e. excited light), and the excited light has a substantially same color as the exciting light.

In addition, if the quantum rod sub-layer 30 is very thin, and a light of a relatively low energy reaches the quantum rod sub-layer 30, the plurality of quantum rods, regardless of the relative angles between the long axes thereof and the polarization direction of the light, do not get excited to emit an excited light. As a result, the light can directly pass through the quantum rod sub-layer 30 without a change of color of the light.

According to the present disclosure, a light source can be disposed at a surface of the polarizer 10 that is opposite to the plurality of optical adjustment layers (i.e. a bottom surface of the polarizer 10 as illustrated in FIG. 2A), and the light source is configured to emit a light to excite the plurality of quantum rods in each quantum rod sub-layer 30 to thereby emit an excited light. In other words, the light source is disposed over a light-incident surface of the polarizer 10, configured to emit a light that can transmit into the polarizer 10 from the light-incident surface thereof.

Specifically, after a light is emitted from the light source, the light becomes a linearly polarized light after passing through the polarizer 10, and the linearly polarized light further transmits through each of the plurality of optical adjustment layers successively. When passing through each polarization direction-adjusting sub-layer 20, the linearly polarized light is adjusted by each of the plurality of adjusting portions 21 in each polarization direction-adjusting sub-layer 20 to become adjusted linearly polarized light. After emitting out from each adjusting portions 21, the adjusted linearly polarized light further enters into a corresponding quantum rod sub-layer 30 in the same optical adjustment layer.

If the adjusted linearly polarized light emitting out from an adjusting portion 21 (i.e. exciting light) has a polarization direction that is substantially parallel to a direction of the long axes of the plurality of quantum rods 31a in a light-excitement portion 31 in a corresponding quantum rod sub-layer 30, and the adjusted linearly polarized light also has a relatively high energy, the plurality of quantum rods 31a in the light-excitement portion 31 can emit an excited light, and the color of the excited light depends on the diameter of the plurality of quantum rods 31a.

If the adjusted linearly polarized light emitting out from an adjusting portion 21, which is substantially an exciting light, has a polarization direction that is substantially perpendicular to the direction of the long axes of the plurality of quantum rods 31a in a light-excitement portion 31, the plurality of quantum rods 31a in the light-excitement portion 31 can also emit an excited light, and the color of the excited light emitted by the light-excitement portion 31 is substantially same as the color of the exciting light.

If the adjusted linearly polarized light emitting out from an adjusting portion 21 has a relatively low energy, the plurality of quantum rods 31a in a light-excitement portion 31 do not emit an excited light, and the adjusted linearly polarized light can pass through without a change the color.

If the adjusted linearly polarized light emitting out from an adjusting portion 21 (i.e. exciting light) has a polarization direction that crosses, but is not perpendicular to, the direction of the long axes of the plurality of quantum rods 31a in a light-excitement portion 31, because the exciting light can be divided into a first polarized component that is substantially parallel, and a second polarized component that is substantially perpendicular, to the long axes of the plurality of quantum rods 31a in a light-excitement portion, after the exciting light enters the light-excitement portion 31, the light emitted by the light-excitement portion (i.e. excited light) is substantially a light with mixed colors, comprising a first color derived from the first polarized component of the exciting light and a second color derived from the second polarized component of the exciting light.

As such, after a linearly polarized light whose polarization direction is adjusted by the adjusting portion 21 (i.e. exciting light) enters into a quantum rod sub-layer 30, the color of the light emitted by the light-excitement portion of each quantum rod sub-layer 30 (i.e. excited light) can depend on the diameters of the plurality of quantum rods 31a, maintain as the color of the exciting light, or be a mixed light of two lights of different colors.

Therefore, by means of the plurality of adjusting portions 21 that each corresponds to a same display unit of the display panel (i.e. an orthographic projection of each adjusting portions 21 on the polarizer 10 is within a same region on the polarizer 10, which also is overlapped with an orthographic projection of one display unit of the display panel) to adjust a polarization direction of a light, a light of a desired color can be obtained.

In the display panel disclosed herein, a plurality of optical adjustment layers are stacked successively over a light-emitting surface of the polarizer 10 in a direction gradually farther away from the polarizer 10. If the display panel is configured for realizing a full-color display, after passing through the polarizer 10, a linearly polarized light sequentially transmits through an adjusting portion 21 and a light-excitement portion 31 within each optical adjustment layer, and lights emitted by the light-excitement portion 31 in each of the plurality of optical adjustment layers which correspond to a same display unit of the display panel can be mixed in a thickness direction of the display panel (i.e. direction of light transmission) to thereby form a mixed light of a desired color. As such, each display unit is substantially a pixel of the display panel.

Compared with existing display technologies where a plurality of sub-pixels are arranged side by side in each pixel unit and the colors of the light emitted by the plurality of sub-pixels are mixed in a plane, each of the plurality of light-excitement portions 31 in the display panel as disclosed herein has an area comparable to an area of each sub-pixel in a conventional display panel.

The plurality of light-excitement portions 31 can realize a mixture of colors in each display unit of the display panel corresponding to multiple light-excitement portions 31. Therefore, the multiple light-excitement portions 31 substantially serve as sub-pixels of a pixel unit to realize a full-color display. As such, the display panel disclosed herein can utilize a region of a substantially same size as a sub-pixel in a conventional display panel to realize a full-color display, thus having an improved resolution.

In addition, the display panel disclosed herein realizes a color mixing by allowing the light to pass through the multiple light-excitement portions 31 successively, the light utilization rate can thus be improved compared with a conventional display panel.

Further as shown in FIG. 2A, the light source for the display panel comprises a light-emitting layer 40. The polarizer 10 is disposed or arranged at a light-emitting surface of the light-emitting layer 40, and the plurality of optical adjustment layers are disposed or arranged at a surface of the polarizer 10 that is opposing to the light-emitting layer 40. In other words, the light source is disposed at a light-incident surface of the polarizer 10, and the plurality of optical adjustment layers are disposed at a light-emitting surface of the polarizer 10.

The light-emitting layer 40 is configured to emit lights that can excite the plurality of quantum rods 31a in any quantum rod sub-layer 30 to emit an excited light. As such, the light-emitting layer 40 is substantially a light source for the display panel.

In the display panel disclosed herein, the light-emitting layer 40 is configured to emit a light that can excite the quantum rods 31a in any quantum rod sub-layer 30 to emit an excited light. The light-emitting layer 40 is further configured to emit a light of a color that is different from a color of any excited light emitted by any quantum rod sub-layer 30, thereby allowing the mixing of lights of different colors to realize a full-color display.

In one specific embodiment of the display panel, the light-emitting layer 40 emits a blue light, the display panel comprises two optical adjustment layers, and a quantum rod sub-layer 30 is disposed in each of the two optical adjustment layers. The two quantum rod sub-layers 30 are configured to be able to respectively emit a red light and a green light upon excitation. For convenience in description, these two quantum rod sub-layers and the plurality of quantum rods therein are respectively termed as a red quantum rod sub-layer and red quantum rods configured to be able to emit a red light upon excitation by the blue light emitted from the light-emitting layer 40, and a green quantum rod sub-layer and green quantum rods configured to be able to emit a green light upon excitation by the blue light emitted from the light-emitting layer 40.

Figure 5:
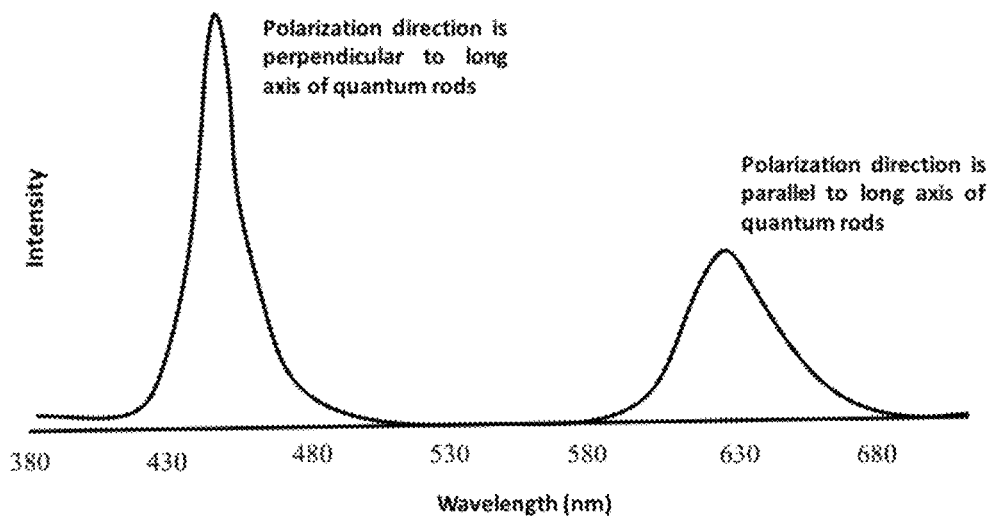
FIG. 5 is an illustrative spectrogram of lights emitted by the red quantum rods upon excitement by a blue light having different polarization directions.

FIG. 5 is an illustrative spectrogram of lights emitted by the red quantum rods able to emit a red light upon excitement by a blue light having different polarization directions. As shown in FIG. 5, the red quantum rods emit a blue light when they are exposed to a blue light whose polarization direction is substantially perpendicular to the direction of the long axes of the red quantum rods, and emit a red light when they are exposed to a blue light whose polarization direction is substantially parallel to the direction of the long axes of the red quantum rods.

Figure 6:
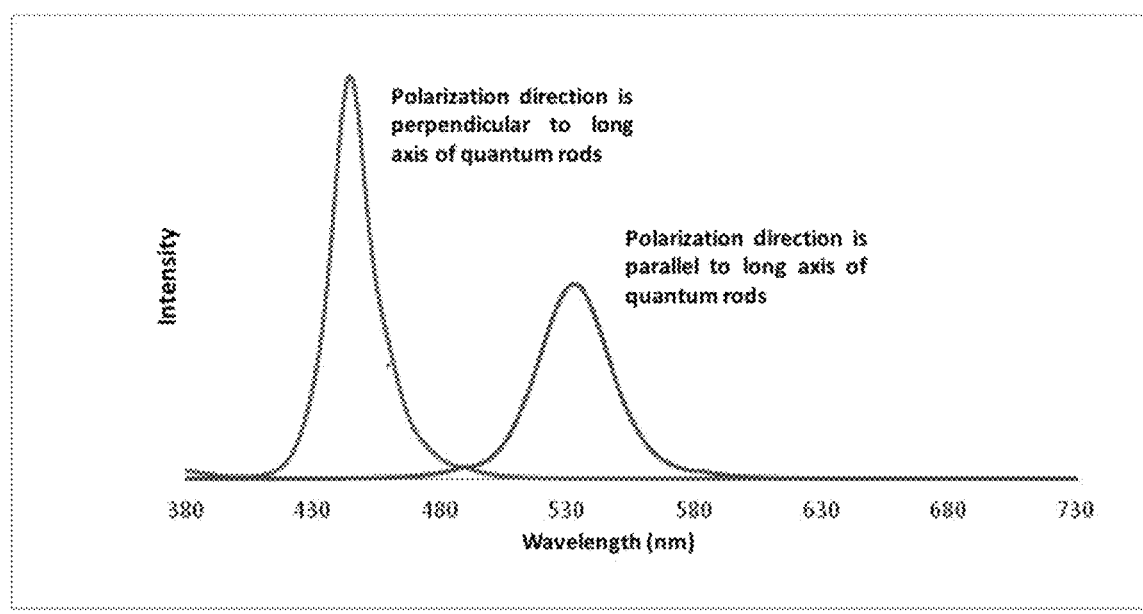
FIG. 6 is an illustrative spectrogram of lights emitted by the green quantum rods upon excitement by a blue light having different polarization directions.

FIG. 6 is an illustrative spectrogram of lights emitted by the green quantum rods able to emit a green light upon excitation by a blue light having different polarization directions. As shown in FIG. 6, the green quantum rods emit a blue light when they are exposed to a blue light whose polarization direction is substantially perpendicular to the direction of the long axes of the green quantum rods, and emit a green light when they are exposed to a blue light whose polarization direction is substantially parallel to the direction of the long axes of the green quantum rods.

As such, in the display panel disclosed herein, a full-color display can be realized by mixing the red light (R), the green light (G), and the blue color (B).

It is noted that besides the above mentioned embodiment of the display panel where two optical adjustment layers are included and the quantum rod sub-layers disposed therein can respectively emit a red light and a green light upon excitement by a blue light, other embodiments are also possible.

For example, the quantum rod sub-layers disposed therein can emit lights of different primary colors upon excitement by a light of a primary color to allow a full-color display. In one specific embodiment, the display panel can include two optical adjustment layers, each comprising a quantum rod sub-layer 30. The two quantum rod sub-layers 30 are configured to be able to emit a magenta light (M) and a yellow light (Y) respectively upon excitation by a cyan light (C), to thereby allow the display panel to realize a full-color display.

In another example, the number of optical adjustment layers can be a number other than two. In one specific embodiment, the display panel can include three optical adjustment layers, each comprising a quantum rod sub-layer 30. The three quantum rod sub-layers 30 are able to emit a red light (R), a green light (G), and a yellow light (Y) upon excitement by a blue light (B), to thereby allow the display panel to realize a full-color display.

According to some preferred embodiments, the light-emitting layer 40 is an organic electroluminescent layer, which specifically comprises an electron injection sub-layer, an electron transport sub-layer, a light-emitting sub-layer, a hole transport sub-layer, and a hole injection sub-layer.

In a conventional display technology employing an organic electroluminescent layer, each pixel unit in an OLED display panel typically comprises three sub-pixels (i.e. a red sub-pixel, a green sub-pixel and a blue sub-pixel), the optical functional layers in these three different sub-pixels commonly have a significantly different working life. For example, the working life of the optical functional layer in the blue sub-pixel is notably shorter than that in the red sub-pixel or in the green sub-pixel. After being in use for a long time, the attenuation of blue sub-pixels is faster and the attenuation of the green sub-pixel and red sub-pixel is slower. As a result, the images displayed by an OLED display panel tend to be yellowish.

Compared with the conventional display technology as described above, in the display panel disclosed herein, the light-emitting layer substantially adopts an electroluminescent functional layer having a uniform color, thus the phenomenon of color cast (i.e. color bias) after a long time of use can be reduced.

In the following, with reference to FIG. 2, the structure, function, and configuration of the various layers of each optical adjustment layer will be described in detail.

As illustrated in FIG. 2A, the display apparatus comprises a plurality of substrates, which include a first substrate 51 and a plurality of second substrates 52. The first substrate 51 is disposed underneath the light-emitting layer 40, and each second substrate 52 is included in the display panel, and is specifically disposed between each quantum rod sub-layer 30 and its corresponding polarization direction-adjusting sub-layer 20. The first substrate 51 and each of the plurality of second substrates 52 can have a same or different composition.

For the convenience of control of color of the light emitted, as illustrated in FIG. 3, the plurality of quantum rods 31a in a same quantum rod sub-layer 30 are configured to have a substantially same direction in the long axes thereof according to some embodiments of the display panel. Furthermore, the plurality of quantum rods 31a in all of the quantum rod sub-layers 30 can be configured to have a substantially same direction in the long axes thereof.

Herein, the plurality of quantum rods 31a can have a composition such as cadmium sulfide (CdS), cadmium senelide (CdSe), cadmium telluride (CdTe), zinc senelide (ZnSe), etc.

Further as shown in FIG. 2A, each adjusting portion 21 comprises a liquid crystal sub-layer 21c, and at least one driving electrode. The at least one driving electrode is arranged over one or both sides of the liquid crystal sub-layer 21c, and is configured to apply an electric field to the liquid crystal sub-layer 21c to thereby adjust the liquid crystals in the liquid crystal sub-layer 21c to rotate (i.e. to alter an orientation thereof).

The liquid crystal sub-layers 21c of each adjusting portion 21 can form an integral structure in each polarization direction-adjusting sub-layer 20. Each adjusting portion 21 is configured to have an electric field, and the electric field corresponding to each adjusting portion 21 is configured to be independent to one another. Herein, "independent" electric fields are referred to as the electric fields that do not interfere with one another.

According to some specific embodiments, the at least one driving electrode comprises a first electrode 21a and a second electrode 21b, which are respectively disposed over the two opposing sides of the liquid crystal sub-layer 21c (i.e. a top side or a bottom side in FIG. 2A). For each adjusting portion 21 in each optical adjustment layer, a pair of a first electrodes 21a and a second electrodes 21b form an independent electric field therebetween. As shown in FIG. 2A, the second electrodes 21b of different adjusting portions 21 are arranged to be spaced apart and insulated from one another, and the first electrodes 21b of different adjusting portions 21 form an integral structure, but can also be configured to be spaced apart and insulated from one another.

It should be noted that in order not to influence the transmission of the light, the first electrode 21a and the second electrode 21b can each have a composition of a transparent material such as tin indium oxide (ITO).

Upon application of different levels (i.e. voltages, or potentials) to the first electrode 21a and the second electrode 21b, a vertical electric field can be formed between the first electrode 21a and the second electrode 21b. As a result, the liquid crystals of the corresponding adjusting portion 21 are all located within the electric field, as such, the polarization direction of the light passing through the adjusting portion 21 can be adjusted accordingly.

In some embodiments, the number of the second electrodes 21b can be same as the number of the liquid crystal sub-layers 21c in each adjusting portion 21 in each polarization direction-adjusting sub-layer 20 in the whole display panel.

Further as illustrated in FIG. 2A, a first electrode 21a corresponding to a lower liquid crystal sub-layer 21c in the lower optical adjustment layer and a second electrode 21b corresponding to an upper liquid crystal sub-layer 21c in the upper optical adjustment layer can be spaced apart by a substrate (i.e. the second substrate 52) to be insulated from each other.

Figure 2B:
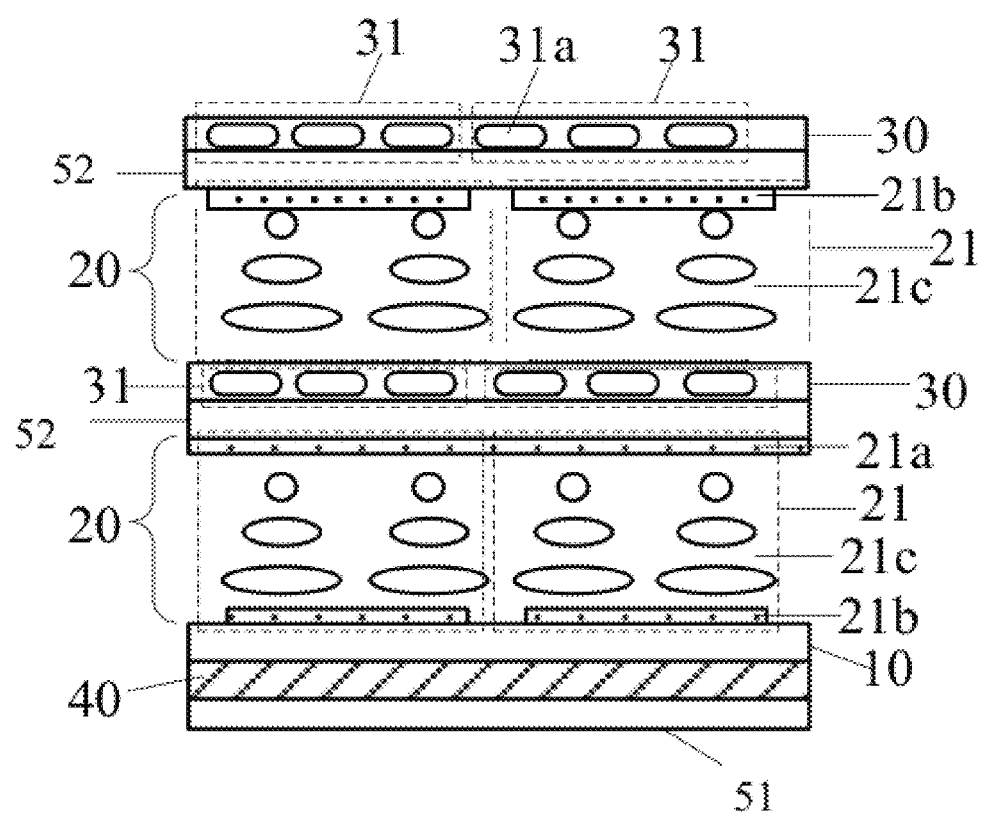

In order to simplify the structure, according to some preferred embodiments, one electrode can be shared by two neighboring polarization direction-adjusting sub-layers 20. In one specific embodiment as illustrated in FIG. 2B, a first electrode 21a and a second electrode 21b are respectively disposed over the upper surface and the lower surface of each liquid crystal sub-layer 21c in each adjusting portion in the lower optical adjustment layer. Only a second electrode 21b is disposed over the upper surface of each liquid crystal sub-layer 21c in each adjusting portion in the upper optical adjustment layer.

As such, the first electrode 21a and the second electrode 21b in the lower optical adjustment layer can form a vertical electrical field in the liquid crystal sub-layer 21c in each adjusting portion in the lower optical adjustment layer, and the first electrode 21a in the lower optical adjustment layer and the second electrode 21b in the upper optical adjustment layer can form another vertical electrical field in the liquid crystal sub-layer 21c in each adjusting portion in the upper optical adjustment layer. In other words, one first electrode 21a is shared by the two optical adjustment layers (i.e. the lower optical adjustment layer and the upper optical adjustment layer), yet still helps to form two vertical electrical fields for the two optical adjustment layers respectively.

The second electrode 21b of the odd-numbered polarization direction-adjusting sub-layer 20 and the second electrode 21b of the previous polarization direction-adjusting sub-layer 20 can be integrated or substantially shared by this pair of polarization direction-adjusting sub-layers 20.

As such, the display panel specifically can comprise two optical adjustment layers. The first electrode 21a in a lower polarization direction-adjusting sub-layer 20 is arranged below a lower liquid crystal sub-layer 21c, the first electrode 21a in an upper polarization direction-adjusting sub-layer 20 is arranged above the upper liquid crystal sub-layer 21c, and a single second electrode 21b is arranged between the lower liquid crystal sub-layer 21c and the upper liquid crystal sub-layer 21c. Thus the two liquid crystal sub-layers 21c (i.e. the upper liquid crystal sub-layer and the lower liquid crystal sub-layer) substantially share the second electrode 21b.

Furthermore, in order to align the liquid crystal sub-layer 21c, each optical adjustment layer further comprises two alignment sub-layers (not shown in figures), arranged respectively at two opposing sides of the liquid crystal sub-layer 21c, which are configured to horizontally align the liquid crystal sub-layer 21c. The two alignment sub-layers are configured to have their respective alignment directions substantially perpendicular to each other, to thereby form a twisted nematic (TN) structure.

The two alignment sub-layers of each optical adjustment layer are further configured such that the alignment sub-layer close to the quantum rod sub-layer 30 has an alignment direction substantially perpendicular to the direction of the long axes of the quantum rods 31a in the quantum rod sub-layer 30, and that an alignment sub-layer far away from the quantum rod sub-layer 30 has an alignment direction substantially parallel to the direction of the long axes of the quantum rods 31a in the quantum rod sub-layer 30. In accordance, the polarizer 10 is configured to have a polarization direction thereof substantially parallel to the alignment direction of the alignment sub-layer closest to the polarizer 10.

The following is noted. Within a same optical adjustment layer, the two alignment sub-layers are respectively arranged on the two surfaces of the liquid crystal sub-layer 21c, and the quantum rod sub-layer 30 is arranged over one surface of the liquid crystal sub-layer 21c. As such, the alignment sub-layer close to the quantum rod sub-layer 30 is referred to as the alignment sub-layer which is over a same surface of the liquid crystal sub-layer 21c as the quantum rod sub-layer 30, whereas the alignment sub-layer far away from the quantum rod sub-layer 30 is referred to as the alignment sub-layer which is over a different surface of the liquid crystal sub-layer 21c as the quantum rod sub-layer 30.

In order to provide driving signals to the liquid crystal sub-layer 21c of each adjusting portion 21 to drive the liquid crystals to rotate, the display panel further comprises a first driving circuit (or first driving module) and a second driving circuit (or second driving module) according to some embodiments of the disclosure (not shown in figures).

The first driving circuit is coupled with, and is configured to provide driving signals to, the at least one driving electrode in each adjusting portion 21, so that an adjustable electric field can be formed in the liquid crystal sub-layer 21c, which can in turn adjust a light emitted by the plurality of quantum rods 31a in each of the plurality of light-excitement portions 31 in an uppermost quantum rod sub-layer 30 to thereby control the display of color images by the display panel.

In one specific embodiment, the first driving circuit is configured to provide a pixel voltage to each first electrode 21a, and to provide a common voltage to each second electrode 21b. It is also possible that the first driving circuit is configured to provide a common voltage to each first electrode 21a, and to provide a pixel voltage to each second electrode 21b.

The second driving circuit is configured to adjust a brightness of the light emitted by the light-emitting layer 40, so that a gray scale of the display panel can be adjusted. In embodiments where the light-emitting layer 40 is an organic electroluminescent layer, the second driving circuit is configured to provide a driving current to the light-emitting layer 40.

In the following, with reference to FIGS. 2A, 2B, and 7-13, the working principles, and the processes, of displaying images of different colors, of the display panel will be described in detail by an illustrating embodiment that follows.

In this embodiment, the display panel comprises a polarizer 10, two optical adjustment layers (i.e. an upper optical adjustment layer and a lower optical adjustment layer) stacked above the polarizer 10, and a light-emitting layer 40 underneath the polarizer 10, as shown in the figures. The light-emitting layer 40 comprises a blue organic electroluminescent layer (i.e. an organic electroluminescent layer configured to emit a blue light).

In the two optical adjustment layers, a quantum rod sub-layer 30 in the lower optical adjustment layer is a green quantum rod sub-layer (i.e. a quantum rod sub-layer able to emit a green light upon excitement by a blue light), and a quantum rod sub-layer 30 in the upper optical adjustment layer is a red quantum rod sub-layer (i.e. a quantum rod sub-layer able to emit a red light upon excitement by a blue light).

As shown in the figures, a polarization direction of the polarizer 10 and directions of the long axes of the quantum rod sub-layer 30 in each optical adjustment layer are all along an X-axis direction.

In each optical adjustment layer, an alignment direction of one alignment sub-layer above the liquid crystal sub-layer 21c is substantially parallel to a direction of the long axes of the quantum rods in the corresponding quantum rod sub-layer 30, and thus is also along the X-axis direction. An alignment direction of another alignment sub-layer underneath the liquid crystal sub-layer 21c is along a Y-axis direction.

Table 1 illustrates driving currents that are provided to the light-emitting layer 40 (i.e. "Current in the light-emitting layer") and driving voltages that are applied to each liquid crystal sub-layer 21c when the display panel displays different colors. In Table 1, the voltage on the liquid crystal sub-layer (i.e. "Voltage on the lower liquid crystal sub-layer" and "Voltage on the upper liquid crystal sub-layer") is a voltage between the levels (potentials or voltages) that are applied to the first electrodes 21a and the second electrodes 21b disposed over two opposing surfaces of the liquid crystal sub-layer 21c.

TABLE 1

|  | Blue | Red | Green | Yellow | Cyan |
|---|---|---|---|---|---|
| R Gray Scale | 0 | 255 | 0 | 255 | 0 |
| G Gray Scale | 0 | 0 | 255 | 255 | 255 |
| B Gray Scale | 255 | 0 | 0 | 0 | 255 |
| Current in the light-emitting layer | 8 mA | 8 mA | 8 mA | 15 mA | 15 mA |
| Voltage on the lower liquid crystal sub-layer | 0 | 0 | 4.2 V | 2.0 V | 2.0 V |
| Voltage on the upper liquid crystal sub-layer | 4.2 V | 0 | 0 | 0 | 4.2 V |

|  | Purple | Light Purple | Light Blue | Yellowish Brown | White |
|---|---|---|---|---|---|
| R Gray Scale | 255 | 150 | 0 | 150 | 255 |
| G Gray Scale | 0 | 100 | 100 | 100 | 255 |
| B Gray Scale | 255 | 255 | 255 | 0 | 255 |
| Current in the light-emitting layer | 15 mA | 15 mA | 12 mA | 8 mA | 22.5 mA |
| Voltage on the lower liquid crystal sub-layer | 0 | 2 V | 1 V | 1.8 V | 1 V |
| Voltage on the upper liquid crystal sub-layer | 2.0 V | 1.5 V | 4.2 V | 0 | 2 V |

Specifically, when displaying a blue image L255 (R0, G0, B255), the driving current provided to the light-emitting layer 40 is 8 mA; the driving voltage applied to the lower liquid crystal sub-layer 21c is 0 V, which causes the liquid crystals therein remain in an initial state; the driving voltage applied to the upper liquid crystal sub-layer 21c is 4.2 V, which causes the liquid crystals therein to rotate for a relatively large angle, so that the polarization direction of the linearly polarized light passing through the upper liquid crystal sub-layer 21c is kept unchanged.

Figure 7:
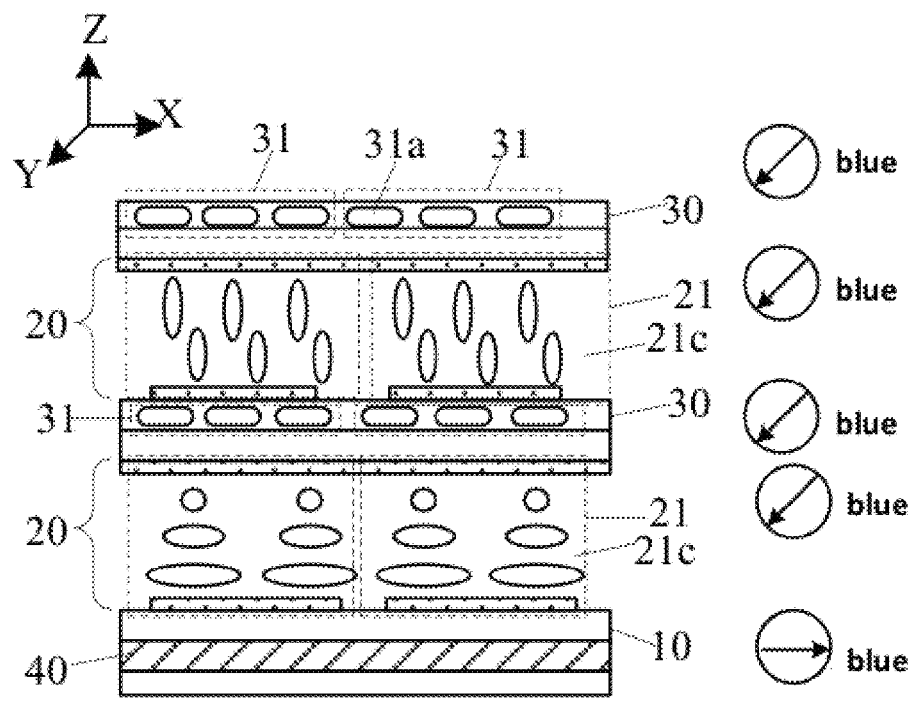
FIG. 7 is a diagram illustrating the working principles of the display panel when blue images are displayed.

With reference to FIG. 2A and FIG. 7, the blue light emitted by the light-emitting layer 40 is converted into a blue linearly polarized light having a polarization direction along the direction of the X-axis after passing through the polarizer 10, which is further converted into a blue linearly polarized light having a polarization direction along the Y-axis direction after passing through the lower liquid crystal sub-layer 21c.

When the above blue linearly polarized light further enters into the green quantum rod sub-layer 30 (i.e. the lower quantum rod sub-layer), because the polarization direction thereof is substantially perpendicular to the direction of the long axes of the green quantum rods in the green quantum rod sub-layer 30, the light emitted out from the green quantum rod sub-layer 30 is a blue linearly polarized light having a polarization direction along the Y-axis direction.

When the above blue linearly polarized light further enters into the upper liquid crystal sub-layer 21c, the polarization state of the light does not change, and thus still remains as a blue linearly polarized light having a polarization direction along the Y-axis direction.

When the above blue linearly polarized light enters into the red quantum rod sub-layer 30 (i.e. the upper quantum rod sub-layer), because its polarization direction is substantially perpendicular to the direction of the long axes of the red quantum rods in the red quantum rod sub-layer 30, the light emitted out from the red quantum rod sub-layer 30 is thus still a blue light.

When displaying a red image L255 (R255, G0, B0), the driving current provided to the light-emitting layer 40 is 8 mA; the driving voltages applied to the two layers of liquid crystal sub-layer 21c are both 0 V, which causes the liquid crystals in the two liquid crystal sub-layers to be both in their initial state.

Figure 8:
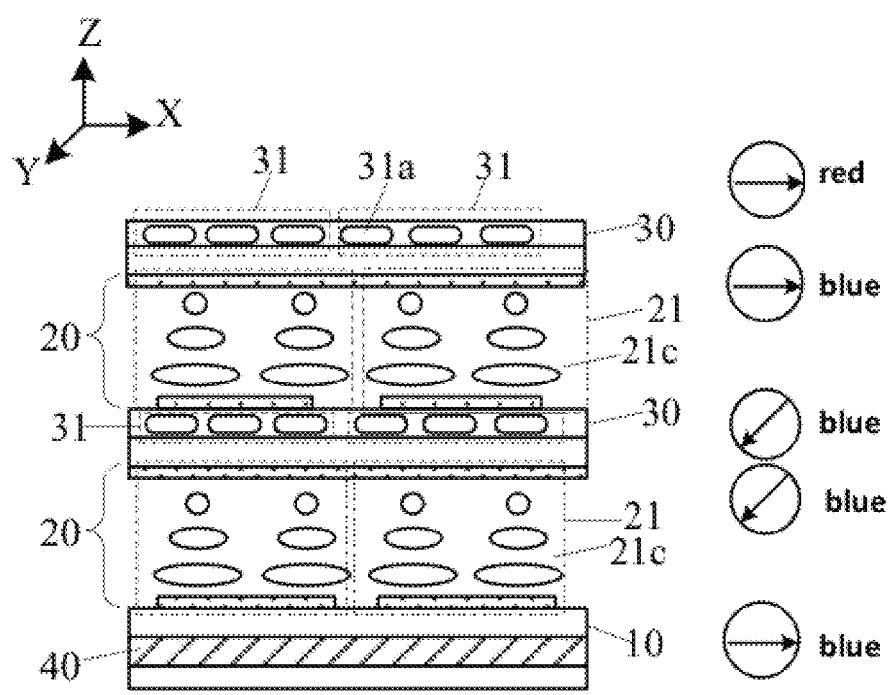
FIG. 8 is a diagram illustrating the working principles of the display panel when red images are displayed.

With reference to FIG. 2A and FIG. 8, the blue light emitted by the light-emitting layer 40 is converted into a blue linearly polarized light along the X-axis direction after passing through the polarizer 10, which is further converted into a blue linearly polarized light having a polarization direction along the Y-axis direction after passing through the lower liquid crystal sub-layer 21c.

When the above blue linearly polarized light enters the green quantum rod sub-layer 30 (i.e. the lower quantum rod sub-layer), because the polarization direction thereof is substantially perpendicular to the direction of the long axes of the green quantum rods in the green quantum rod sub-layer 30, the light emitted out from the green quantum rod sub-layer 30 is a blue linearly polarized light having a polarization direction along the Y-axis direction.

When the above blue linearly polarized light further enters into the upper liquid crystal sub-layer 21c, it is further converted into a blue linearly polarized light having a polarization direction along the X-axis direction.

When the above blue linearly polarized light enters into the red quantum rod sub-layer 30 (i.e. the upper quantum rod sub-layer), because its polarization direction is substantially parallel to the direction of the long axes of the red quantum rods in the red quantum rod sub-layer 30, the light emitted out from the red quantum rod sub-layer 30 is thus a red light.

When displaying a green image L255 (R0, G255, B0), the driving current provide to the light-emitting layer 40 is 8 mA; the driving voltage V1 applied to the lower liquid crystal sub-layer 21c is 4.2 V, which can cause the liquid crystals therein to rotate for a relatively large angle; and the driving voltage V2 applied to the upper liquid crystal sub-layer 21c is 0 V, which causes the liquid crystals to be in their initial state.

Figure 9:
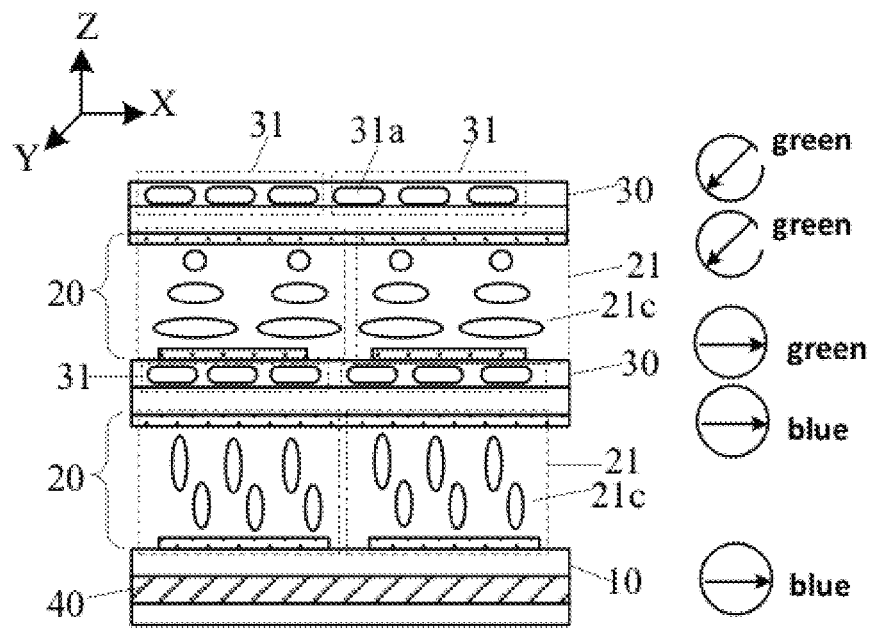
FIG. 9 is a diagram illustrating the working principles of the display panel when green images are displayed.

With reference to FIG. 2A and FIG. 9, the blue light emitted by the light-emitting layer 40 is converted into a blue linearly polarized light along the X-axis direction after passing through the polarizer 10, which further remains as a blue linearly polarized light having a polarization direction along the X-axis direction after passing through the lower liquid crystal sub-layer 21c.

When the above blue linearly polarized light enters into the green quantum rod sub-layer 30 (i.e. the lower quantum rod sub-layer), because the polarization direction thereof is substantially parallel to the direction of the long axes of the green quantum rods in the green quantum rod sub-layer 30, the light emitted out from the green quantum rod sub-layer 30 is a green linearly polarized light having a polarization direction along the X-axis direction.

When the above green linearly polarized light further enters into the upper liquid crystal sub-layer 21c, it is further converted into a green linearly polarized light having a polarization direction along the Y-axis direction.

When the above green linearly polarized light enters into the red quantum rod sub-layer 30 (i.e. the upper quantum rod sub-layer), because the green linearly polarized light is substantially perpendicular to long axes of the quantum rods in the red quantum rod sub-layer 20, after passing through the red quantum rod sub-layer 30, the red quantum rod sub-layer are not excited, and the light emitted out from the red quantum rod sub-layer 30 remains thus as a green light.

When displaying a yellow image (R255, G255, B0), the driving current provided to the light-emitting layer 40 is 15 mA; the driving voltage provided to the lower liquid crystal sub-layer 21c is 2 V, which causes the liquid crystals therein to rotate for a certain angle (shown in FIG. 10), and thereby the polarization direction of the linearly polarized light passing through can be changed to a certain degree; and the driving voltage applied to the upper liquid crystal sub-layer 21c is 0 V.

Figure 10:
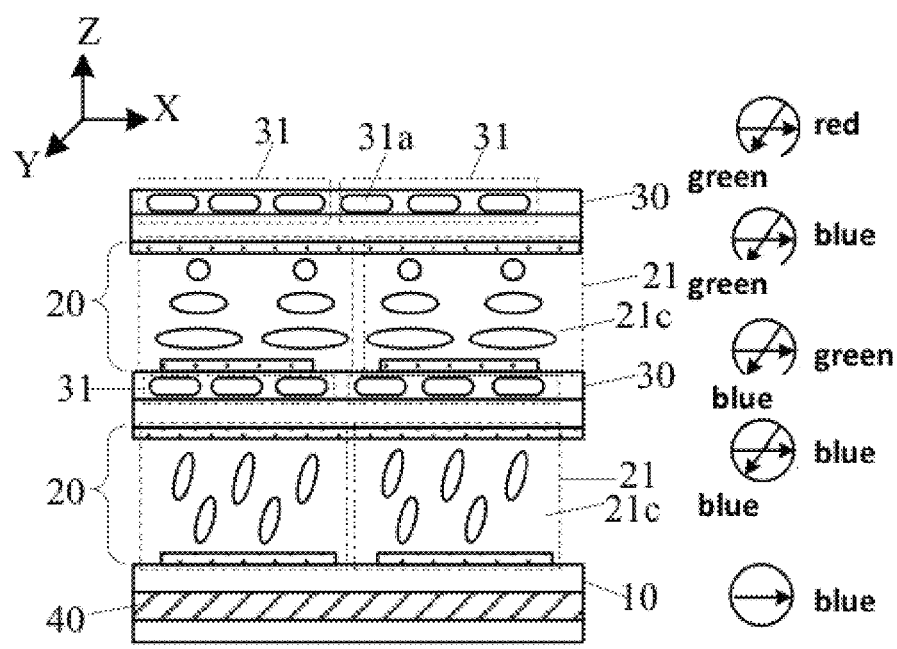
FIG. 10 is a diagram illustrating the working principles of the display panel when yellow images are displayed.

With reference to FIG. 2A and FIG. 10, the blue light emitted by the light-emitting layer 40 is converted into a blue linearly polarized light along the X-axis direction after passing through the polarizer 10, which further remains as a blue linearly polarized light, yet having a polarization direction along both the X-axis direction and the Y-axis direction (i.e. the blue polarized light has a first polarized component on the X-axis and a second polarized component on the Y-axis) after passing through the lower liquid crystal sub-layer 21c.

Of the blue linearly polarized light, the first polarized component on the X-axis direction is converted into a green linearly polarized light having its polarization direction along the X-axis after passing through the green quantum rod sub-layer; and the second polarized component on the Y-axis direction remains still as a blue polarized light having its polarization direction along the Y-axis direction after passing through the green quantum rod sub-layer.

When the above green linearly polarized light and the above blue linearly polarized light enter into the upper liquid crystal sub-layer 21c, the polarization directions of both blue and green lights can have a 90-degree change respectively, and thus the lights emitted out from the upper liquid crystal sub-layer 21c are a green linearly polarized light having its polarization direction along the Y-axis direction and a blue linearly polarized light having its polarization direction along the X-axis direction.

When the above green linearly polarized light and the above blue linearly polarized light enter into the red quantum layer 30 (i.e. the upper quantum rod sub-layer), because the energy of the green linearly polarized light polarized along the Y-axis is relatively low, the light emitted out from the red quantum layer 30 remain as a green light. At the same time, because the polarization direction of the blue linearly polarized light polarized along the X-axis direction is substantially parallel to the direction of the long axes of the red quantum rods, the light emitted out from the red quantum layer 30 is a red light. As such, the display panel displays a yellow light mixed by the red light and the green light.

When displaying a cyan image (R0, G255, B255), the driving current provided to the light-emitting layer 40 is 15 mA; the diving voltage V1 provided to the lower liquid crystal sub-layer 21c is 2 V; the driving voltage V2 provided to the upper liquid crystal sub-layer 21c is 4.2 V; and the liquid crystals in both liquid crystal sub-layers 21c can rotate for different angles.

Figure 11:
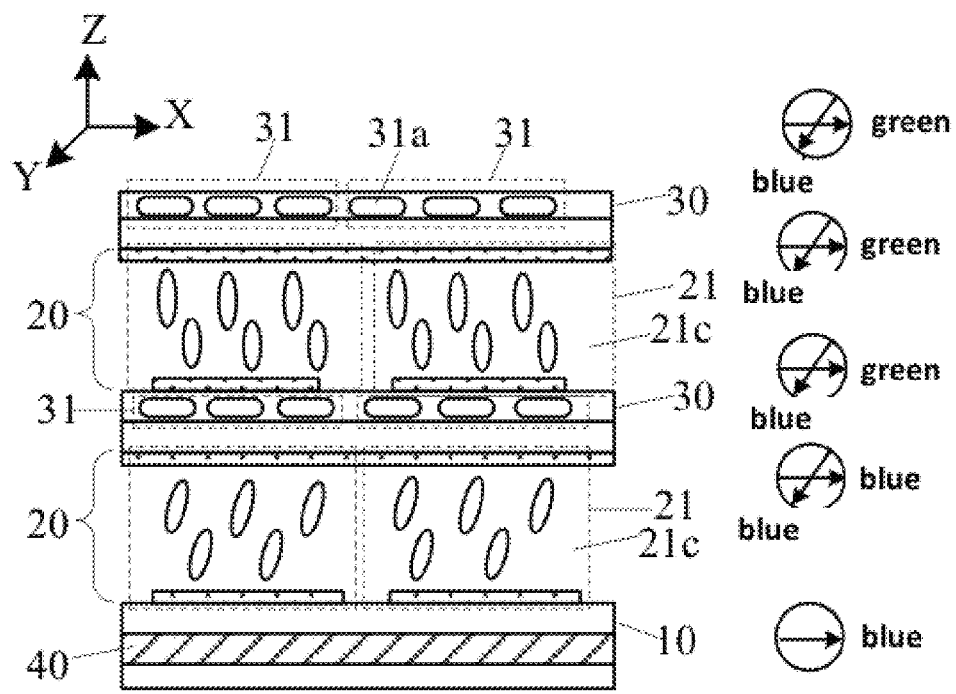
FIG. 11 is a diagram illustrating the working principles of the display panel when cyan images are displayed.

With reference to FIG. 2A and FIG. 11, the blue light emitted by the light-emitting layer 40 is converted into a blue linearly polarized light along the X-axis direction after passing through the polarizer 10, which further remains as a blue linearly polarized light, yet having a polarization direction along both the X-axis direction and the Y-axis direction (i.e. the polarized light has a first polarized component on the X-axis and a second polarized component on the Y-axis) after passing through the lower liquid crystal sub-layer 21c.

Of the blue linearly polarized light, the first polarized component on the X-axis direction is converted into a green linearly polarized light having its polarization direction along the X-axis after passing through the green quantum rod sub-layer; and the second polarized component on the Y-axis direction remains still as a blue polarized light having its polarization direction along the Y-axis direction after passing through the green quantum rod sub-layer.

When the above green linearly polarized light and the above blue linearly polarized light enter into the upper liquid crystal sub-layer 21c, the polarization directions of both lights do not change, after passing through the upper liquid crystal sub-layer 21c.

When the above green linearly polarized light and the above blue linearly polarized light enter into the red quantum layer 30 (i.e. the upper quantum rod sub-layer), because the energy of the green linearly polarized light polarized along the Y-axis is relatively low, the light emitted out from the red quantum layer 30 remain as a green light. At the same time, because the polarization direction of the blue linearly polarized light polarized along the X-axis direction is substantially perpendicular to the direction of the long axes of the red quantum rods, the light emitted out from the red quantum layer 30 is a blue light. As such, the display panel displays a cyan light mixed by a green light and a blue light.

When displaying a purple image (R255, G0, B255), the driving current provided to the light-emitting layer 40 is 15 mA; the driving voltage provided to the lower liquid crystal sub-layer 21c is 0 V, the driving voltage provided to the upper liquid crystal sub-layer 21c is 2 V.

Figure 12:
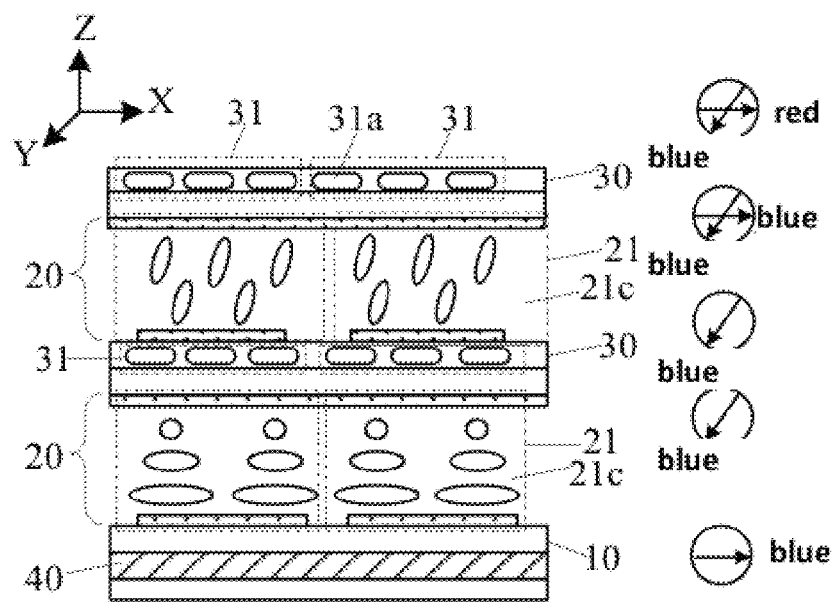
FIG. 12 is a diagram illustrating the working principles of the display panel when purple images are displayed.

With reference to FIG. 2A and FIG. 12, the blue light emitted by the light-emitting layer 40 is converted into a blue linearly polarized light having a polarization direction along the X-axis direction after passing through the polarizer 10, which is further converted into a blue linearly polarized light having a polarization direction along the Y-axis direction after passing through the lower liquid crystal sub-layer 21c.

When the above blue linearly polarized light enters into the green quantum rod sub-layer 30 (i.e. the lower quantum rod sub-layer), because the polarization direction of the blue linearly polarized light is substantially perpendicular to the long axes of the green quantum rods in the green quantum rod sub-layer 30, the light emitted from the green quantum rod sub-layer 30 is still a blue linearly polarized light having its polarization direction along the Y-axis direction.

When the above blue linearly polarized light further enters into the upper liquid crystal sub-layer 21c, it remains as a blue linearly polarized light, yet having a polarization direction along both the X-axis direction and the Y-axis direction (i.e. the polarized light has a first polarized component on the X-axis and a second polarized component on the Y-axis) after passing through the upper liquid crystal sub-layer 21c.

Of the above blue linearly polarized light, the first polarized component on the X-axis direction is converted into a red linearly polarized light having its polarization direction along the X-axis after passing through the red quantum rod sub-layer; and the second polarized component on the Y-axis direction remains still as a blue polarized light having its polarization direction along the Y-axis direction after passing through the red quantum rod sub-layer. As such, the display panel displays a purple light mixed by the red light and the blue light.

When displaying a white image (R255, G255, B255), the driving current provided to the light-emitting layer 40 is 22.5 mA; the driving voltage applied to the lower liquid crystal sub-layer 21c is 1 V, the driving voltage applied to the upper liquid crystal sub-layer 21c is 2 V.

Figure 13:
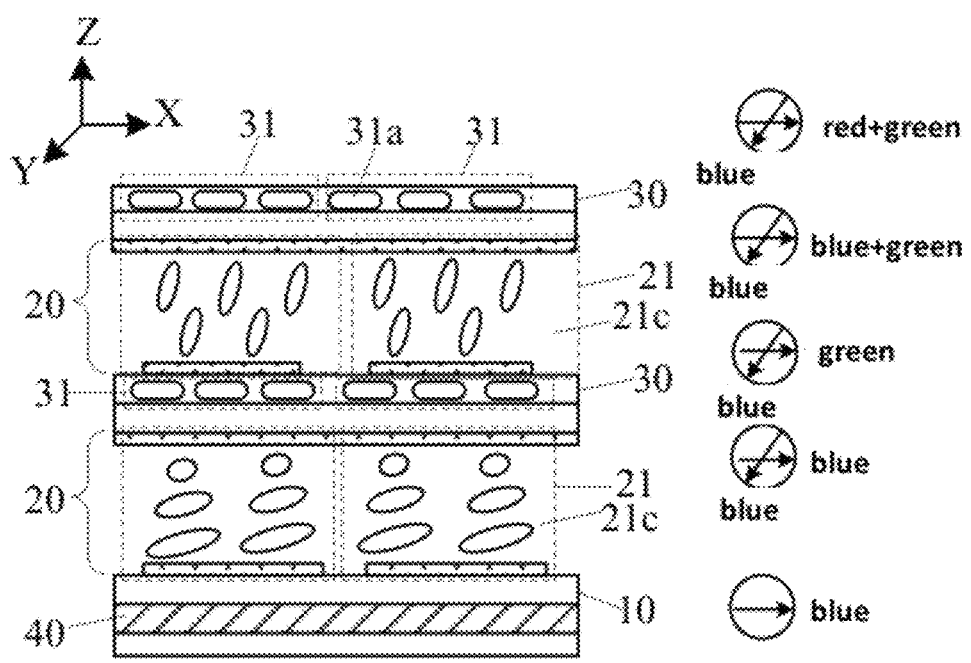
FIG. 13 is a diagram illustrating the working principles of the display panel when white images are displayed.

With reference to FIG. 2A and FIG. 13, the blue light emitted by the light-emitting layer 40 is converted into a blue linearly polarized light having a polarization direction along the X-axis direction after passing through the polarizer 10, which is further converted into a blue linearly polarized light having an altered polarization direction after passing through the lower liquid crystal sub-layer 21c. In the blue linearly polarized light, it is configured such that a first polarized component along the X-axis direction is about ⅓ of the blue linearly polarized light, and a second polarized component along the Y-axis direction is about ⅔ of the blue linearly polarized light.

When the above blue linearly polarized light enters into the green quantum rod sub-layer 30 (i.e. the lower quantum rod sub-layer), the first polarized component is converted into a green linearly polarized light (along the X-axis direction), whereas the second polarized component of the light remains as a blue linearly polarized light (along the Y-axis direction).

When the above green linearly polarized light (corresponding to the first polarized component along the X-axis direction) and the above blue linearly polarized light (corresponding to the second polarized component along the Y-axis direction) enter into the upper liquid crystal sub-layer 21c, one half of the blue polarized light (corresponding to the second polarized component) along the Y-axis direction has its polarization direction along the X-axis direction, and another half of the blue polarized light along the Y-axis direction.

As such, after passing through the red quantum rod sub-layer, a half of the above blue linearly polarized light becomes a red light, and another half is still a blue light. After mixing the red light and the blue light, and the aforementioned green light, which are configured to have an equally intensity, a white light can thus be displayed.

It is noted that the aforementioned images of different colors are only examples to illustrate color images that can be displayed by the display panel disclosed herein, and the display panel can also display images of other colors.

Generally, during display of the display panel, the light-emitting layer 40 is provided with a driving current to adjust a brightness of a light emitted thereby, and each of the two liquid crystal sub-layers 21c (i.e. the lower liquid crystal sub-layer 21c and the upper liquid crystal sub-layer 21c) is provided with a driving voltage to adjust an angle of rotation of the liquid crystals disposed therein. As such, the polarization direction of the lights passing through each liquid crystal sub-layer 21c and strengths of polarized components of the light along each direction can be adjusted, in turn resulting in the generation of various lights of different color and different intensity upon excitement by each quantum rod sub-layer 30, which are ultimately mixed to thereby realize the display of a light of a specified color.

In one example, when displaying a purple image (R150, G100, B255), the driving current provided to the light-emitting layer is 15 mA, the driving voltage provided to the lower liquid crystal sub-layer 21c is 2 V, and the driving voltage provided to the upper crystal layer 21c is 1.5 V.

In another example, when displaying a light blue image (R0, G100, B255), the driving current provided to light-emitting layer 40 is 12 mA, the driving voltage provided to the lower liquid crystal sub-layer 21c is 1 V, and the driving voltage provided to the upper liquid crystal sub-layer 21c is 4.2 V.

In yet another example, when displaying a yellowish brown image (R150, G100, B0), the driving current provided to the light-emitting layer 40 is 8 mA, the driving voltage provided to the lower liquid crystal sub-layer 21c is 1.8 V, the driving voltage provided to the upper liquid crystal sub-layer 21c is 0 V.

It is noted that in these above examples, the working principles and processes for displaying each different colors are substantially identical as the working principles and processes for displaying the aforementioned color images such as red, green, yellow, and cyan, are thus not repeated herein.

In another aspect, the present disclosure provides a display apparatus. The display apparatus comprises a display panel according to any of the embodiments as described above.

The display apparatus can be any display-purposed electronic product or component such as electronic papers, mobile phones, tablets, televisions, monitors, notebooks, digital frames, and navigators.

Due to the advantageous features including improved resolution and the light utilization rate associated with the display panel, the display apparatus comprising the display panel thus also has an improved resolution and the light utilization rate. Additionally, the display apparatus also has reduced power consumption.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display panel, comprising:
    a polarizer, configured to convert a light incident from a light-incident surface thereof into a linearly polarized light emitting out from a light-emitting surface thereof; and
    a plurality of optical adjustment layers stacking over one another over the light-emitting surface of the polarizer, each comprising:
        a polarization direction-adjusting sub-layer comprising a plurality of adjusting portions, configured to adjustably control a polarization direction of an incident polarized light; and
        a quantum rod sub-layer over a surface of the polarization direction-adjusting sub-layer distal to the polarizer, comprising a plurality of light-excitement portions and configured to adjustably change a wavelength of the incident polarized light, wherein each of the plurality of light-excitement portions comprises a plurality of quantum rods, each configured to have a long axis thereof to be in a substantially same direction.

2. The display panel of claim 1, wherein the plurality of adjusting portions in the polarization direction-adjusting sub-layer and the plurality of light-excitement portions in the quantum rod sub-layer in each of the plurality of optical adjustment layers respectively correspond to a plurality of display units, configured such that an orthographic projection of one light-excitement portion corresponding to a display unit on the polarizer overlaps with an orthographic projection of one adjusting portion corresponding to a same display unit on the polarizer.

3. The display panel of claim 2, wherein each of the plurality of adjusting portions in the polarization direction-adjusting sub-layer in each of the plurality of optical adjustment layers further comprises two alignment sub-layers, arranged respectively at two opposing sides of, and contacting with, the liquid crystal sub-layer, and configured to horizontally align the liquid crystal sub-layer, wherein:
    the two alignment sub-layers are configured to have respective alignment directions thereof substantially perpendicular to each other to thereby form a twisted nematic (TN) structure.

4. The display panel of claim 3, wherein the two alignment sub-layers are further configured such that:
    one of the two alignment sub-layers proximate to the quantum rod sub-layer in the each of the plurality of optical adjustment layers has an alignment direction thereof substantially perpendicular to a direction of long axes of the plurality of quantum rods; and
    another of the two alignment sub-layers distal to the quantum rod sub-layer in the each of the plurality of optical adjustment layers has an alignment direction thereof substantially parallel to the direction of the long axes of the plurality of quantum rods in the quantum rod sub-layer.

5. The display panel of claim 4, wherein the alignment direction of the another of the two alignment sub-layers is configured to be substantially parallel to a polarization direction of the polarizer.

6. The display panel of claim 2, wherein the plurality of optical adjustment layers are configured such that:
- each light-excitement portion in a same quantum rod sub-layer is capable of emitting a light having a substantially same color upon excitement; and
- each light-excitement portion in a different quantum rod sub-layer is capable of emitting a light having a different color upon excitement.

7. The display panel of claim 1, wherein each of the plurality of adjusting portions in the polarization direction-adjusting sub-layer in each of the plurality of optical adjustment layers comprises:
- a liquid crystal sub-layer, comprising a plurality of liquid crystals; and
- at least one driving electrode over one side, or two opposing sides, of the liquid crystal sub-layer, configured to apply an electric field to the liquid crystal sub-layer to adjust an orientation of the plurality of liquid crystals therein to thereby adjustably control the polarization direction of the incident polarized light.

8. The display panel of claim 7, wherein the at least one driving electrode in each of the plurality of adjusting portions in the polarization direction-adjusting sub-layer in each of the plurality of optical adjustment layers consists of a first electrode and a second electrode, arranged over two opposing sides of the liquid crystal sub-layer, wherein:
- at least one of the first electrode and the second electrode in each adjusting portion is configured to be spaced apart from a corresponding electrode in an adjacent adjusting portion to thereby allow an electric field formed therebetween to be insulated from one another.

9. The display panel of claim 8, wherein at least one of the first electrode and the second electrode in a polarization direction-adjusting sub-layer of one optical adjustment layer is shared with a corresponding electrode in an adjacent optical adjustment layer.

10. A display apparatus, comprising a display panel according to claim 1.

11. The display apparatus of claim 10, wherein:
- each of the plurality of adjusting portions in the polarization direction-adjusting sub-layer in each of the plurality of optical adjustment layers in the display panel comprises:
  - a liquid crystal sub-layer, comprising a plurality of liquid crystals; and
  - at least one driving electrode over one side, or two opposing sides, of the liquid crystal sub-layer, configured to apply an electric field to the liquid crystal sub-layer to adjust an orientation of the plurality of liquid crystals therein to thereby adjustably control the polarization direction of the incident polarized light;

and
- the display apparatus further comprises a first driving circuit, coupled with, and configured to provide driving signals to, the at least one driving electrode in each of the plurality of adjusting portions in the polarization direction-adjusting sub-layer in the each of the at least one optical adjustment layer.

12. The display apparatus of claim 11, wherein the at least one driving electrode in each of the plurality of adjusting portions in the polarization direction-adjusting sub-layer in the each of the at least one optical adjustment layer consists of a first electrode and a second electrode, arranged over two opposing sides of the liquid crystal sub-layer, wherein:
- the first driving circuit is configured to provide a pixel voltage to one of the first electrode and the second electrode, and to provide a common voltage to another of the first electrode and the second electrode.

13. The display apparatus of claim 10, further comprising a light source, disposed over the light-incident surface of the polarizer, wherein:
- the light source comprises a light-emitting layer configured to emit a light capable of exciting the plurality of quantum rods in each of the plurality of light-excitement portions in the quantum rod sub-layer in the each of the plurality of optical adjustment layers.

14. The display apparatus of claim 13, wherein the plurality of optical adjustment layers are each configured to be capable of emitting a light of a different color upon excitement, and together configured to be able to allow output of a light of white color through mixing of the light from each of the plurality of optical adjustment layers.

15. The display apparatus of claim 14, wherein:
- the light-emitting layer in the light source is configured to emit a blue light; and
- the plurality of optical adjustment layers comprise a lower optical adjustment layer and an upper optical adjustment layer, disposed successively over the polarizer and respectively configured to be capable of emitting a green light and a red light upon excitement.

16. The display apparatus of claim 13, wherein the light-emitting layer comprises an organic electroluminescent layer.

17. The display apparatus of claim 13, further comprising a second driving circuit, configured to adjust a brightness of the light emitted by the light-emitting layer of the light source.

18. A method for controlling a display for a display panel according to claim 1, comprising:
- providing a light incident into the polarizer to thereby obtain a linearly polarized light; and
- controlling each of the plurality of optical adjustment layers such that, upon an input of the linearly polarized light into a lowermost optical adjustment layer, a light of a specified color in a corresponding display unit is outputted from an uppermost optical adjustment layer.

19. The method according to claim 18, wherein each of the plurality of adjusting portions in the polarization direction-adjusting sub-layer in each of the plurality of optical adjustment layers comprises:
- a liquid crystal sub-layer, comprising a plurality of liquid crystals; and
- at least one driving electrode over one side, or two opposing sides, of the liquid crystal sub-layer, configured to apply an electric field to the liquid crystal sub-layer to adjust an orientation of the plurality of liquid crystals therein to thereby adjustably control the polarization direction of the incident polarized light;

wherein:
- the controlling each of the plurality of optical adjustment layers comprises:
  - providing a driving voltage to the at least one driving electrode in each of the plurality of adjusting portions in the polarization direction-adjusting sub-layer in each of the plurality of optical adjustment layers to thereby apply the electric field to the liquid crystal sub-layer.

20. The method according to claim 19, wherein the light is a blue light, and the plurality of optical adjustment layers comprise a lower optical adjustment layer and an upper optical adjustment layer, successively over the polarizer and respectively configured to be capable of emitting a green light and a red light upon excitement, wherein:

the providing a light incident into the polarizer to thereby obtain a linearly polarized light comprises:
   providing the blue light incident into the polarizer to thereby obtain a blue linearly polarized light; and
the providing a driving voltage to the at least one driving electrode in each of the plurality of adjusting portions in the polarization direction-adjusting sub-layer in each of the plurality of optical adjustment layers comprises:
   providing a first driving voltage and a second driving voltage respectively to the at least one driving electrode in each of the plurality of adjusting portions in the polarization direction-adjusting sub-layer in the lower optical adjustment layer and in an upper optical adjustment layer such that a full-color display for the display panel is realized.

* * * * *